United States Patent Office 3,606,761
Patented Sept. 21, 1971

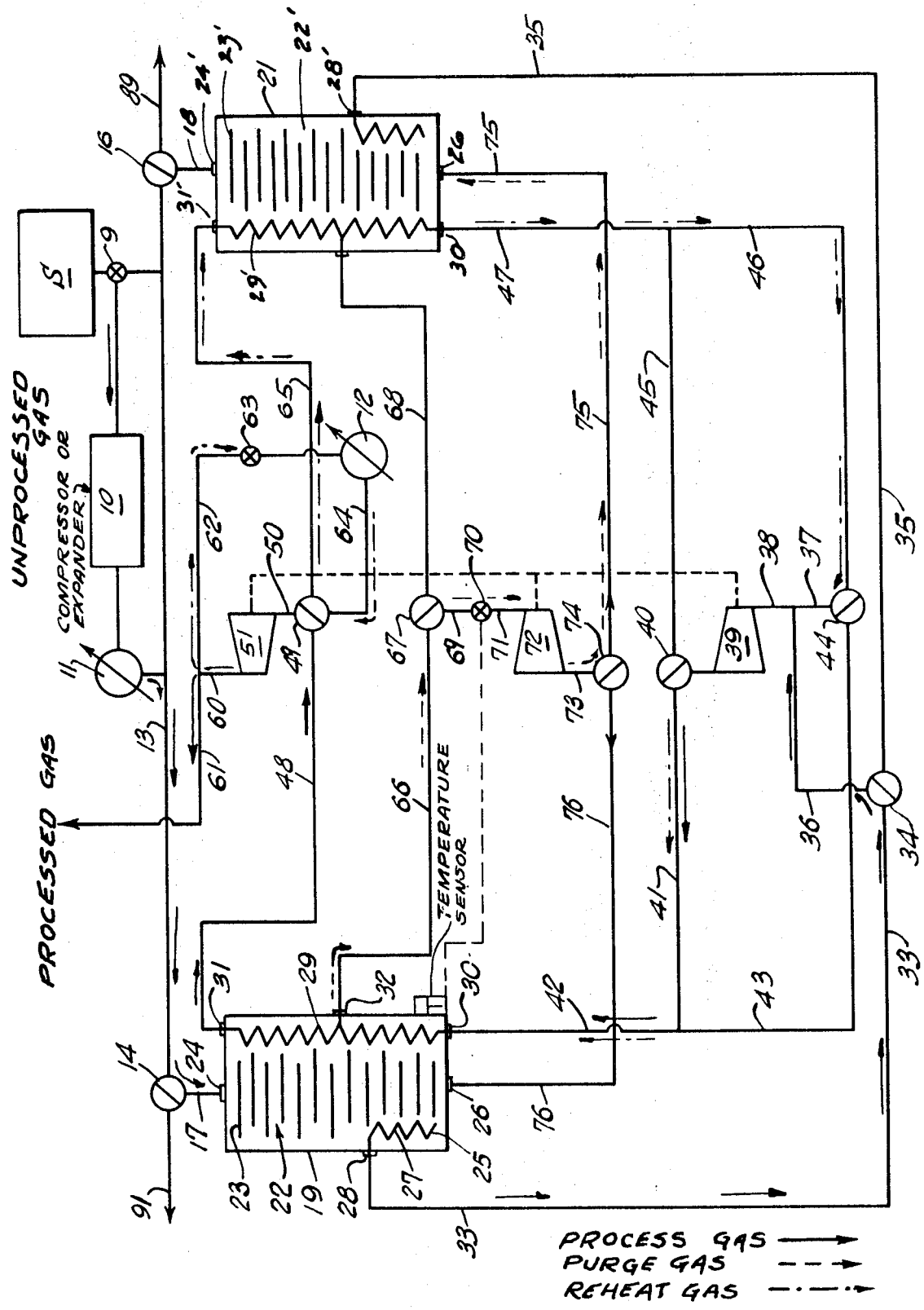

3,606,761
METHOD AND APPARATUS FOR CRYOGENIC GAS SEPARATION
James R. Muenger, Beacon, and David L. Alexander, Fishkill, N.Y., assignors to Texaco Inc., New York, N.Y.
Filed June 28, 1968, Ser. No. 740,963
Int. Cl. F25j 1/00, 3/00, 3/08
U.S. Cl. 62—12                                    13 Claims

ABSTRACT OF THE DISCLOSURE

The invention relates to a method and apparatus for the continuous removal of higher boiling point constituents from a process gas stream containing such constituents. It relates particularly to a process for the purification or enrichment of a gas by cryogenic condensation of the higher boiling point constituents from the gas stream, which condensate is transferred to a minor stream of the purified gas at substantially atmospheric pressure in a purging step. The refrigeration necessary to drive the cryogenic system is furnished by a moderate expansion of the purified gas and a further expansion of the purge gas. The refrigeration potential, represented by the latent heat of the condensate, is conserved by a recycle stream of the purified gas.

---

It is known that the separation of, or purification of gases under cryogenic conditions is readily achieved through a high pressure process supplemented by refrigeration. As a matter of economic practicality the process may be made self-sustaining, at least to a certain extent by at least three expedients. First, by a judicious conservation of refrigeration potential or capability of the cooled gas stream; second, by utilization of the condensed higher boiling constituents; third, by the use of energy derived from expansion of process streams and derived from waste streams.

For example, utilization of the potential energy of a pressurized gas stream to obtain both refrigeration and power by means of an energy conversion unit, such as a turbine expander, is well known. However, the hereindescribed method and apparatus exceeds and improves on the known prior art as matching such energy utilization to the requirements of the condensation process more effectively than has been heretofore provided, thus assuring a balanced, more efficient and less expensive process.

The method is further unique in that it utilizes a purified gas recycle stream to minimize the amount of purge gas needed to revaporize the higher boiling condensed constituents and to discharge them from the system. This is achieved by utilizing a reheat of the purified gas stream before expansion of the latter to partially satisfy the refrigeration requirements of the condensation process. Further, it maintains substantially constant temperature differentials through the condensation cycle, thereby preventing short cycle times such as are characteristic of condensing thermal regenerators whose cycle times are determined in part by the thermal capacity of the vessel packing, and thereby minimizing pressure and product losses due to switching.

It is therefore an object of the invention to provide a method and apparatus for achieving a more effective high-pressure cryogenic purification of a contaminant containing gas. A further object is to provide a method and apparatus for more effective utilization of the energy input of the gas purification system. Still another object is to provide an improved method and apparatus for the cyclic purging of a gas purification system in which an overall thermal balance of the system is achieved by utilization of work expansion energy of the purified gas, and by conservation of the refrigeration capabilities of gas condensates and streams. Another object of the method for gas purification is to provide a suitable reheat of streams prior to expansion to optimize the refrigeration effect and the work recovery obtained.

These and other objects of the invention are realized by provision of a method and apparatus in which a high pressure stream of process gas is purified or enriched through the expedient of separation by partial condensation of higher boiling point constituents from the stream. Partial condensation is achieved at low temperature and at relatively high pressure, together with a retention of at least part of the condensate material. In a subsequent step, contaminant holding heat exchangers are cyclically purged at or near operating temperatures and at a relatively low pressure for removal of the contaminant gases. Contaminant carrying purge gas typically will have fuel value and is fed to a tail gas furnace for the production of useful heat. The purified gas stream is normally furnished at a pressure in accordance with its end use.

Referring to the accompanying figure, and stated in brief, the disclosed system for purifying a contaminated gas, consists of at least two similar heat exchange units 19 and 21, or multiples thereof. Each unit further includes a gas separating chamber having condensate holding or packing elements for retaining higher boiling constituent condensates from the gas stream, and for facilitating necessary heat transfer. Each heat exchanger is manifolded to a source S of the process gas for passing the same cyclically into the respective separating chambers. Heat exchange coils, or extended surface passageways in each coil, are associated with said respective separating chambers and are connected to provide for proper flows of contaminant free gas by which means the required refrigeration and heating are supplied during the respective condensing and purging functions.

The full length heat exchange coil in the separating chamber is connected to the suction of a gas compressor which thereby receives a continuous stream of contaminant free gas. A major portion of such gas stream is passed to a point of use. A second, minor stream is temperature regulated and utilized to affect thermal control of the respective separating chambers. This latter stream is introduced to the warm end of the full length heat exchange coil of the chamber being purged. The part length heat exchange coil of a chamber receiving the raw process gas serves to rewarm purified gas to a suitable temperature for expansion. In so doing, it contributes necessary low temperature refrigeration to the condensation process.

Cyclic purging of the system is achieved by use of a relatively small portion of the purified gas which, after being expanded to approximately atmospheric pressure, is introduced to the cold end of the chamber being purged, and by heat furnished by the aforementioned purified gas recycle stream entering the chamber's full length heat exchange coil at the warm end. The small portion of purified gas used for the purging stream is obtained from an intermediate location of the full length heat exchanger of the other chamber and fed to the inlet of a turbine for expansion.

According to the disclosed method, a contaminant containing process gas is continuously treated to produce a constant gas stream of desired purity. However, continuity of flow is maintained by a basic cycling operation. Thus, contaminant containing gas is alternately introduced to one or more chilled separating chambers for partial condensation. In the alternate cycle, said chambers are purged of contaminants at a relatively low pressure and temperature.

For a more specific description of the apparatus, shown in FIG. 1, the system for carrying out the objectives of the invention includes basically, a source S of a process gas to be purified or enriched. This gas may be drawn from any commercial process in which a useable gaseous product having higher boiling contaminants is derived, preferably at a relatively high pressure. Economically, the discarding of such gaseous by-product is unwise from the point of wasted material and potential energy.

For the present purpose and as used in the following discussion, the term "Process gas" will refer to any gas containing minor percentages of removable constituents, which gas would achieve greater utility were the constituents separated out more or less completely. Such constituents are characterized by a higher boiling point than the main or process gas. According to the method, the constituents are removed by partial condensation at a low temperature, and subsequently evaporated. The term "constituent free' as hereafter used will generally denote the process gas which results from the disclosed method, such gas being substantially free of the above-mentioned higher boiling constituents. Also, to facilitate the description, these constituents are hereafter referred to as contaminants only because they are desirably removed from the main process gas stream.

The initial proces gas flow from source S is first regulated as required by flow control valve 9. If source S does not furnish gas at a desirable working pressure for the purification process a desirable pressure is established by compressing or expanding the gas in compressor or expander unit 10. This unit may be a centrifugal or similar type of compressor adapted to achieve the desired degree of compression. However, it may be a turbine or alternate type of expansion engine adapted to deliver the gas at desired pressure as the circumstances require. It is understood that the gas pressure at S may be such that unit 10 is not required. Further, it is understood that the process gas stream may be throttled down to a suitable working pressure by valve 9. If the gas in S is at elevated temperature and at a pressure such that compression is required in unit 10, the gas may be cooled. This is achieved in a suitable heat exchanger or cooler not shown, prior to compression, to minimize the work of compression. If the gas is at an elevated temperature after having been established at the desired pressure, it is cooled in cooler 11. This unit, as well as cooler 12, is typically a convenient form of water or air cooled heat exchanger, but may contain a refrigerant coil if economical refrigeration is available.

Cooler element 11 is manifolded by line 13, switching valves 14 and 16, and lines 17 and 18 to the vertically disposed heat exchangers 19 and 21. Heat exchanger 19 and 21 may follow any of a number of physical embodiments adapted to carrying out their function in the process. In the instant arrangement, units 19 and 21 are substantially identical in structure and thermal characteristics to assure constancy in the gaseous product.

Heat exchanger 19 includes a separating chamber 22 having a plurality of vertically stacked condensate holding trays, plates, fins or the like 23. Oppositely disposed openings 24 and 26 provide access to and from the separating chamber for passage of gas through the chamber to contact trays 23. Openings 24 admits a stream of unpurified process gas during the condensation or purifying part of the two-part cycle. Opening 26 is used for introduction of a purge gas stream in the vaporization or purge part of the two-part cycle.

A first heat transfer element such as a coil or tube bundle 27 is disposed in heat exchange relationship with separating chamber 22 in the colder portion of the chamber, to in effect regulate temperature within the chamber and within the process stream during the condensation phase or part of the two-part cycle. Contaminant free gas enters heat exchanger 19 at opening 26 in the colder end of the separating chamber 22, and leaves by pipe 28 which communicates with chamber 22 through the wall of exchanger 19. In passing through heat exchange coil 27, purified gas returns refrigeration to separating chamber 22, and is itself warmed to a desired temperature for expansion. It is understood that first coil or tube bundle 27 may be manifolded following normal practice, and that the terminal openings 25 and 28 may be single or multiple as is desirable for constructional reasons.

A second coil or heat transfer element 29 is likewise disposed in heat exchange relation with separating chamber 22, normally extending the full length, or substantially the full length of heat exchanger 19. A connection 30 to heat exchange element 29 communicates with the cold end of vessel 19, and a connection 31 of element 29 enters the warm end of vessel 19.

An intermediate connection to heat exchanger 29 is received through the wall of vessel 19 at 32. These connections provide for the proper flow of contaminant free gas through the heat exchange element. During the condensation phase of the cycle, cold purified gas enters 29 and 30. A minor stream leaves 29 via 32 at an intermediate temperature, the latter stream to be expanded for use as a purge gas stream in exchanger 21. The major portion of the gas stream entering 30 rises through the exchanger and leaves at 31 after having been fully warmed. In the process of being warmed, the gas flowing through exchange element 29 furnishes required refrigeration for the condensation process.

Since heat exchanger 21 is substantially identical in structure and thermal transfer characteristics to heat exchanger 19, identical primed numbers are applied to the elements of 21 corresponding to the elements in unit 19.

Contaminant free gas leaving heat exchanger element 27 at 28 is conducted by line 33 to a 3-ported valve 34. The latter is further connected with lines 35 and 36. Functionally, valve 34 connects line 33 to line 36 during the period when heat exchanger 19 is in condensation phase and blocks flow in line 35, and heat exchanger coil 27' of vessel 21 at the same time. Contaminant free gas flowing in line 36 joins a flow of contaminant free gas from line 37. The combined flow passes through line 38 to the inlet of an intermediate expansion turbine or similar engine 39 for expansion to a desired temperature prior to carrying out its refrigeration function in heat exchange element 29. As expanded contaminant free gas leaves turbine 39, it is directed by 3-ported switching valve 40 to lines 41 and 42, thereafter to enter heat exchanger coil 29 at 32. Valve 40 at the same time closes line 45, and a similar valve 44 closes line 43 during the condensation phase of vessel 19.

A major or first flow of the contaminant free gas stream leaving heat exchanger coil 29 at 31 is conducted by line 48 to a 4-ported switching valve 49 which directs said flow by way of line 50 to the suction inlet of compressor 51. Thus, the contaminant free gas stream is compressed to a predetermined pressure compatible with the process into which the gas is used. Said stream is carried through line 61 connected to the high pressure discharge of compressor 51.

A second line 62 communicated with compressor discharge 60, carries a minor or second contaminant free stream to cooler 12, the flow rate being controlled by throttling valve 63. Cooler 12 may be associated with cooler 11 or independently controlled and positioned. Cooler 12 discharges a pressurized gas stream by line 64 through the 4-ported valve 49 and line 65 to the connection 31' of coil 29' in the heat exchanger 21.

The pressurized gas stream passing through exchanger coil 29' while vessel 19 is on the condensation phase of its cycle, and vessel 21 is on the vaporization or purge phase of its cycle, is cooled, leaving heat exchanger 21 at 30'. The cooled, contaminant free stream is conducted by lines 47 and 46 to switching valve 44 which communicates with line 37. The cooled stream joins or is merged with the gas stream from line 36 as has already been described.

The minor or second contaminant free gas stream leaving coil 29 at 32 is conducted by line 66 to a 3-ported switching valve 67 which directs said stream through line 69 to throttling control valve 70 and line 71 to the inlet of low pressure turbine or similar expansion engine 72. The minor gas stream, expanded and chilled in the turbine to substantially atmospheric pressure, exhausts from the turbine through line 73 to 3-ported switching valve 74. The latter directs the stream through line 75 to cold end entry 26' of vessel 21.

Simultaneously, valves 67 and 74 are adjusted to close lines 68 and 76 respectively. The chilled, expanded gas stream passes upward through the packing of vessel 21 carrying with it revaporized contaminants. Together the purge gas and revaporized contaminants, collectively known as tail gas, leave exchanger 21 by port 24' to enter line 18. Three-ported switching valve 16 directs purge system to disposal line 89 while closing passage to line 13. Normally the tail gas is burned to utilize its heat of combustion.

The foregoing description of flows and valve settings all relate to the system connection in which deposition of contaminants and purification of the process gas is conducted in heat exchanger 19, while exchanger 21 is concurrently being purged of contaminants. More precisely, unit 19 is on the condensation phase of 2-phase or 2-part cycle, and unit 21 is on the purge phase of the 2-phase or 2-part cycle. The described system embodies in essence a valving arrangement operable to achieve a simultaneously two-phase operation. The valving may regulate operation of the two phases in any number of heat exchanger sections, however, the present two heat exchanger (19 and 21) system illustrates the principle presently taught.

To provide continuity in the flow of production gas, the valving is such as to alter gas flows between the respective heat exchangers (19 and 21) such that while one condenses, the other is being purged of condensate. Thus, subsequent to the herein described operation wherein unit 19 is on the condensing phase and unit 21 on the purging phase, the adjustment of the respective flow control valves 14, 16, 34, 40, 44, 50, 67, and 74 causes gas flow to be redirected and to reverse the function of the respective units 19 and 21.

It is clear from the figure that if all switching valves are changed, as can be visualized by 90 degree rotation of their vanes in the diagram, that the same flows as described will occur in the opposite vessels, lines, and exchangers; that is, vessel 19 will be in the purge phase and vessel 21 will be in the condensation or purifying phase. This second flow pattern constitutes the second part of the two-part cycle.

Cycling of the system is repeated indefinitely to furnish a steady output of purified gas. The switching or cycling frequency is, of course, contingent on the rate of deposit, or liquid holding capacity of the packing in the separating chambers, and not by the thermal capacity of the packing as is the instance of conventional cleaning regenerators. Temperature profiles prevalent in vessels 19 and 21 are substantially static throughout a given phase of the cycle. This is true whether a heat exchanger is on the condense or purge step. Trapping losses, which normally occur during switching of thermal regenerators or reversing heat exchangers, are minimized by maintaining a low cycle frequency. Thus, relatively great pressure differences between the condensing and purging phases of the cycle can be tolerated. Large pressure differences between the phases of the cycle are desirable since they are to some extent responsible for high yields and for high refrigeration efficiency.

The condensation phase of the cycle operates by supplying sufficient refrigeration to accomplish two purposes i.e.; to chill the process gas, and to condense impurities therefrom. This refrigeration is furnished virtually in its entirety by the contaminant free streams flowing in the respective heat exchanger coils. Refrigeration is conserved by rewarming all gas streams prior to discharge from the system, it is further generated by extraction from the gas as the latter is expanded in turbine expanders 39 and 72. Further, refrigeration is transferred as required by the cold and exchanger coil of the condensing unit and by the full length exchanger coils (29 and 29') in both heat exchangers. Gas flow through the full length coil of the unit being purged transfers both latent and sensible refrigeration from said unit, to the gas stream entering the other of condensing unit to achieve the required refrigeration on the stream.

The purge step or operation relies basically on a low mass flow rate of gas at relatively low pressure to carry away revaporized contaminants and provide a favorable atmosphere for their revaporization. It relies further on heat furnished by the recycle stream passing through the full length coil to supply the heat of vaporization. The recycle stream is thus chilled and thereby transfers refrigeration represented by the vaporization of the contaminants and the warming of the purge stream to the condensing unit as herein stated.

Desirable condition of thermal balance of the operation is maintained by design of the system for suitable gas pressures and flows for the needed purification, and by flow adjustment as the system operates. The latter is effected primarily by throttling valves 63 and 70 which may be connected for manual or automatic operation. Adjustment is only necessary to correct for system drifts and is not necessarily contingent on the switching valve cycle frequency.

To further utilize potential energy of the system, the work produced by expansion engines 39 and 72 is harnessed to furnish part of the compression work of compressor 51. The residual work needed for gas compression is furnished by an external source which may be in the form of a steam turbine, electric motor, or other suitable drive. Generally, the heat of combustion of the tail gas will be more than adequate for generating this additional source of power input.

OPERATION

As an illustration of the gas purification or enrichment process herein described, the purification of off-gas from a catalytic gasoline reformer is selected. The raw process gas is initially available at a pressure of approximately 450 p.s.i.a. or 30.6 atmospheres and essentially atmospheric temperature. The gas composition comprises prior to treatment approximately 80 mole percent hydrogen; 12.5, methane; 4.0, ethane; 2.0 propane; and 1.5, heavier hydrocarbons. A hydrogen end product of 98 percent or better purity is required in good yield at a minimum pressure of 30 atmospheres.

The incoming gas rate of flow is regulated to the desired value primarily by flow control valve 9. This flow rate will constitute the basis for stating flow rates of all other gas streams in the process.

In this instance, neither the compression or expansion unit 10, nor the cooler 11 is required or used since the condition of the gas is stabilized. The regulated flow of incoming raw process gas enters separating chamber 22 through port 24 at approximately 440 p.s.i.a. and 80° F. The temperatures in the respective separating chambers are maintained essentially constant with respect to time, by the regulated flows which will be described, such temperatures will vary with respect to vertical location. At the warm end, adjacent to port 24 and connection 31, the chamber temperature is approximately 78° F. Temperatures in chamber 22 continually decrease in the direction of cold end connection 30, although not necessarily linearly with distance. The temperature at the chamber cold end is approximately −275° F.

Process gas introduced to the separating chamber upper end will flow through chamber 22 where the higher boiling constituents will tend to condense out and be retained on or in condensate holders 23. Condensation will continue as the temperature of the incoming gas becomes continually lower in close conformance to the temperatures maintained in the condensation chamber. Specifically, condensation will occur as a natural tendency of the partial pressures of the higher boiling constituents to adjust to their decreasing vapor pressures as chilling of the gas mixture proceeds.

In this connection, the partial pressure of any constituent is equal to the gaseous moles of that constituent multiplied by the total pressure of the gas mixture, divided by the total gaseous moles of the mixture. The vapor pressure of a constituent is a function of temperature and is, of course, a property of the constituent.

The adjustment of partial pressure to vapor pressure does not follow perfectly because of solubility and other effects, but in the instant conditions, departures are not serious. Data published by Hiza and Herring, p. 190, "International Advances in Cryogenic Engineering," Plenium Press, New York (1965), for example, are useful for adjusting conditions at the cold end of the separating chamber to achieve the desired results and have been used in the illustrative example.

Process gas arriving at the cold end of separating chamber 22 will be of desired purity and will consist of hydrogen, plus 2 percent methane with nil higher boiling constituents. The molar rate of gas flow at this location will be about 81.63 percent of the entering gas flow, and it will be at approximately 438 p.s.i.a. and —273° F. The balance of the entering gas stream is retained on the condensate holders 23 as liquid, plus a small amount of solid in the instance of the highest boiling constituents.

Purified or contaminant free gas leaves the cold end of the separating chamber 22 by entering the lower end of heat exchange coil 27 at opening 25. After returning refrigeration by heat exchange to chamber 22, through coil 27, the contaminant free stream leaves unit 19 through connection 28 at approximately 437 p.s.i.a. and —190° F. It then passes through line 33, switching valve 34, and line 36 to combine with a stream of contaminant free gas issuing from line 37. The combined stream flowing through line 38 will have a flow rate of approximately 137 percent that of the entering gas and will be at approximately 437 p.si.a. and —235° F.

The combined stream of line 38 is expanded in turbine 39 of approximately 80 percent adiabatic efficiency to approximately 138 p.s.i.a. and —284° F. The expansion thus produces a refrigeration effect necessary to drive the process and contribute shaft work which can be used to help drive compressor 51. The expanded stream is conducted to heat exchanger coil 29 of vessel 19 through switching valve 40, lines 41 and 42, and connection 30. The contaminant free gas flowing through coil 29 is warmed by the separating chamber and its counterflowing gas which is being purified.

The major part of the flow entering coil 29 leaves at connection 31. At this point the flow is approximately 125 percent of that of the raw gas entering the process. The pressure and temperature at 31 are approximately 125 p.s.i.g. and 71° F. respectively. The second or minor stream leaving coil 29 at connection 32 will be described later.

The major part of the gas flow leaving coil 29 is passed through line 48, switching valve 49, and line 50 to the inlet of compressor 51 which operates at approximately 80 percent adiabatic efficiency. The compressed stream leaving the compressor in line 60 is at approximately 447 p.s.i.a. and 199° F. This stream is split, 68.8 percent of the entering gas flow being delivered as purified 98 percent hydrogen through 61, the remainder, 55.7 percent of the entering gas flow being delivered to line 62 as a recycle stream, the division being controlled by flow control valve 63.

The recycle gas stream in line 62 is cooled to approximately 80° F. in cooler 12 and is directed through line 64, switching valve 49, and line 65 to connection 31' of coil 29' in vessel 21. In flowing from the warm to cold end of coil 29', the recycle warm stream furnishes heat to vaporize liquid and solid contaminants remaining in separating chamber 22' from the previous condensation cycle. It also furnishes heat to warm the counterflowing gases in the separating chamber. In so doing, the recycle stream is chilled, leaving coil at 30' as a stream of 55.7 percent flow and approximately 437 p.s.i.a. and —273° F. This stream is directed to lines 47 through lines 46, switching valve 44, and thence to combine with the gas stream from line 36 as has been noted previously.

The second or minor stream leaving coil 29 at connection 32 consists of approximately 12.8 percent of the entering raw process gas molar flow rate. This contaminant free or 98 percent purity hydrogen is at a pressure and temperature of approximately 132 p.s.i.g. and —177° F. respectively. The desired flow rate is established by flow control valve 70 and the stream is conducted by lines 66, 69, and 71 and switching valve 67 to the inlet of a low pressure turbine 72. The turbine expands the stream at approximately 80 percent adiabatic efficiency to a pressure and temperature of about 20.5 p.s.i.g. and —276° F. respectively, thereby producing a refrigeration effect and consequently shaft power. The shaft power can be used to partially satisfy the power requirements of the compressor as was noted in the instance of expander 39.

The gas stream leaving the low pressure turbine outlet is directed through lines 73, switching valve 74, and line 75 to opening 26' to the condensation chamber 22' of vessel 21. This purge gas stream functions to carry the revaporized contaminants, previously condensed in said chamber from vessel 21. In the course of flowing through chamber 22', the purge or carrier gas stream is warmed and increases in molar flow as a result of the revaporized material. The heat necessary to warm said stream is obtained by heat exchange with coil 29' from the recycle gas, which in effect recovers the refrigeration capability of the purge stream and transfers it to the condensing unit 19, where it is needed.

Warmed purge gas, plus the revaporized and rewarmed contaminants which it carries, are conducted from chamber 22' at opening 24'. At this point, the gas is considered as "tail gas" and has a molar flow rate of approximately 31.2 percent of that of the entering gas stream. It is at a pressure and temperature of approximately 20 p.s.i.g. and 72° F., and contains approximately 16 percent of the entering hydrogen, 89 percent of the entering methane and virtually all of the higher boiling hydrocarbons. Tail gas is carried by line 18, valve 16 and line 89 for discharge from the system to the atmosphere or, onto further use.

Functioning of the system for reversing the phases of the cycle is instituted by operating the respective switching valves such that vessel 19 is purged and vessel 21 becomes the condensing vessel. In this instance, tail gas is discharged from the system by line 99. Flows, pressures, and temperatures correspond to those which have been previously stated.

Since normal system balance requires substantially static temperature profiles in the two heat exchange units (19 and 21), it is clear that flows must vary or be adjusted as the percentage of contaminant in the process gas feed varies. In particular, the recycle and purge gas streams must increase as the amounts of contaminant in the stream increases. These flows are controlled by valves 63 and 70 respectively. Proper thermal balance can be monitored by any of several means including monitoring the cold end temperatures in the two vessels 19 and 21, and adjusting flows accordingly.

The frequency of switching is a design junction of the apparatus as influenced by the flow rate and contaminant holding capacity of the trays or packing of the condensation chambers. A switching period of 10 minutes is found to be reasonable to successfully achieve the above described process.

The net power requirement of the process in the foregoing example is approximately 79 horse power per million standard cubic feet per day of product. The heat of combustion available in the discharged tail gas embodies sufficient energy to generate more than ten times this amount of power in heat engines or power plants of moderate efficiency.

Regarding purity, the system described is capable of product purities of greater than 98 percent if required by a rebalancing to obtain lower temperatures in the cold end of the separating chambers.

Obviously, other modifications and variations of the invention as hereinbefore set forth may be made without departing from the spirit and scope thereof, only such limitations should be imposed as are indicated in the appended claims.

We claim:

1. Method for the continuous high pressure cryogenic separation of discrete vaporizable constituents from a pressurized process gas stream in which said constituents are characterized by a higher boiling point than the boiling point of said process gas, which method includes the step of:

condensing said higher boiling point constituents from said process gas stream within a first separating chamber which is maintained at a pressure greater than the boiling point of said vaporizable constituents whereby to provide a gas stream substantially free of said constituents, work expanding the entire constituent-free gas stream to provide a source of energy, and to form a cooled low pressure gas stream, cyclically reducing the pressure in said first separating chamber holding condensed constituents to vaporize the latter, while simultaneously bypassing incoming process gas from said first chamber to a second separating chamber, heat exchanging said cooled, constituent-free gas stream with said process gas stream in said first separating chamber to reheat the constituent-free stream, forming a minor, partially heated stream from said constituent-free gas stream, work expanding said minor, partially heated constituent-free stream to a reduced pressure, and introducing the latter to said first separating chamber whereby to purge vaporized constituents therefrom.

2. The method as defined in claim 1 wherein said first separating chamber, and said minor gas stream of constituent-free gas, are reduced to substantially atmospheric pressure during said constituent purging step.

3. The method as defined in claim 1 including; the step of cyclically reducing the pressure in said first separating chamber while simultaneously introducing a purge stream of constituent-free gas to said first separating chamber.

4. The method as defined in claim 3 including; the step of regulating the flow of said minor gas stream subsequent to the partial heating thereof, and prior to the work expansion of said minor stream.

5. The method as defined in claim 4 wherein said minor gas stream flow is recycled in response to temperature conditions in said first and second separating chambers respectively.

6. An apparatus for the continuous high pressure purification of a gas stream by a cyclic condensation of higher boiling point constituents to produce an enriched gas stream, which apparatus comprises:

(a) at least two heat exchangers of substantially identical thermal characteristics, each heat exchanger including an uprightly disposed separating chamber having inlet and outlet ports communicated therewith, and condensate retaining means therein, said respective at least two heat exchangers being cyclically operable during condensing and purging cycles, (b) means for cyclically communicating said respective separation chambers with a pressurized source of said process gas containing higher boiling point constituents, (c) a purge system integral with said apparatus and including;
(1) conduit means communicating said respective separating chambers,
(2) work producing expansion means disposed in said conduit means for reducing the pressure of a gas stream therein and communicated with the downstream side of said separation chambers for receiving a stream of constituent-free gas,
(3) flow regulating means connected with said conduit means and being adjustable to selectively direct a flow of low pressure purge gas to at least one of said separating chambers to contact condensed constituents held therein and removed from said process gas during the period when said separation chamber is on a condensing cycle.

7. In the apparatus as defined in claim 6 wherein said expansion means includes a gas expansion turbine.

8. In the apparatus defined in claim 6 wherein each of said heat exchanger separating chambers includes; a gas recycle coil disposed in heat exchange relation with said separating chamber, and said purge system conduit means includes an inlet connected to said recycle coil to receive at least a portion of the gas stream passing through the latter.

9. In the apparatus defined in claim 6 including; valve means disposed in said conduit means being operable to regulate the flow rate of said gas passing into said work producing expansion means.

10. In the apparatus as defined in claim 9 wherein; said valve means is automatically operable to regulate the flow of purge gas in response to the thermal conditions in said separating chamber being purged.

11. An apparatus for the continuous high pressure purification of a gas stream by the cyclic condensation of high boiling point constituents to produce an enriched gas stream, which apparatus comprises;

(a) at least two heat exchangers of substantially identical thermal characteristics and each including an uprightly disposed separation chamber having inlet and outlet ports communicated therewith, and condensate retaining means therein, said respective at least two heat exchangers being cyclically operable on condensing and purging cycles, (b) means for cyclically communicating said respective separating chambers with a source of said process gas containing higher boiling point constituents, (c) a purge system integral with said apparatus and including; a purge line communicating the respective separating chambers for passing a flow of gas to at least one of said separating chambers being purged, (d) a gas reheat system including,
(1) a reheat coil disposed longitudinally of and in heat exchange relation with respective separating chambers, said reheat coil having an upper and lower end,
(2) a recycle conduit communicating said recycle coil at the upper end for passing a flow of purified process gas from a separating chamber on the condensing cycle to a separating chamber on the purging cycle, and
(3) means in said recycle conduit for controlling the pressure and temperature of a separating chamber while on the purge cycle.

12. In an apparatus as defined in claim 11 including; a return conduit communicating the respective lower ends of said recycle coils in said separating chambers.

13. In an apparatus as defined in claim 11 wherein said recycle circuit includes;

(1) a gas pressurizing means positioned to pressurize a recycle gas flow passing therethrough, and
(2) valve means adjustable to regulate the flow rate of said recycle gas flow.

References Cited

UNITED STATES PATENTS

| | | | |
|---|---|---|---|
| 2,089,558 | 8/1937 | Karwat | 62—12 |
| 2,836,040 | 5/1958 | Schilling | 62—13 |
| 3,210,946 | 10/1965 | Hughes | 62—13 |
| 3,375,672 | 4/1968 | Jakob | 62—13 |
| 3,418,820 | 12/1968 | Swearingen | 62—39 |

NORMAN YUDKOFF, Primary Examiner

A. F. PURCELL, Assistant Examiner

U.S. Cl. X.R.

62—38